Nov. 12, 1957 K. V. LYSEN 2,812,992
LUGGAGE CARRIERS FOR AUTOMOBILES
Filed Jan. 18, 1954 2 Sheets-Sheet 1

INVENTOR.
KERMIT V. LYSEN

BY Paul, Moore + Dugger

ATTORNEYS

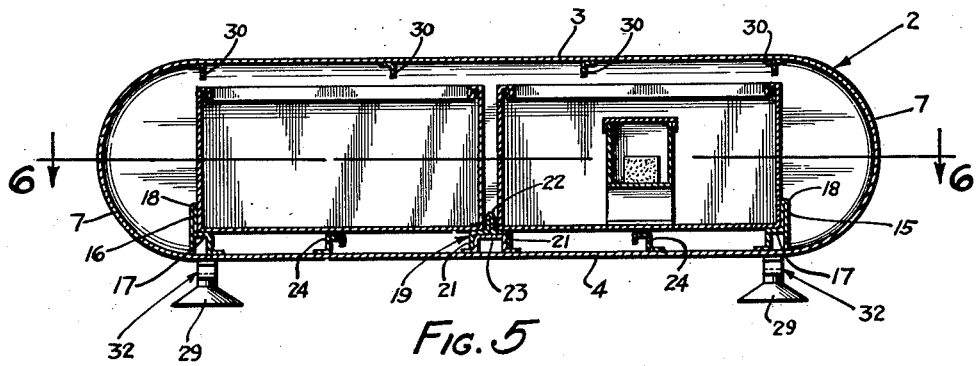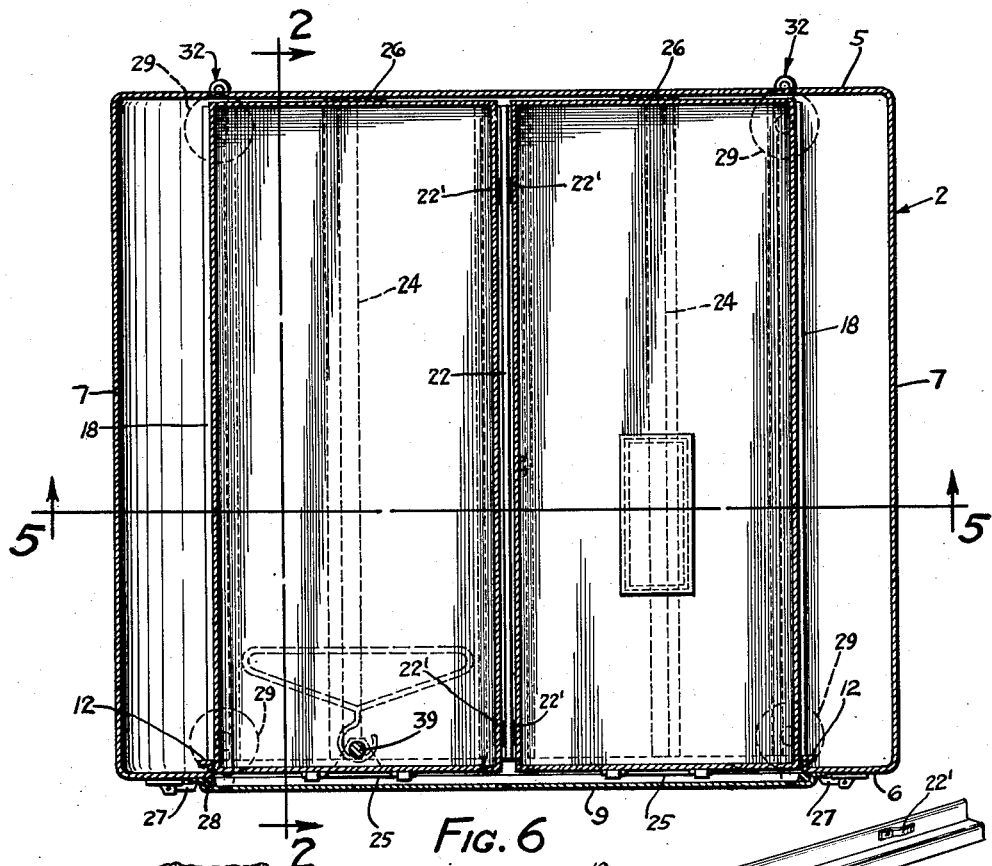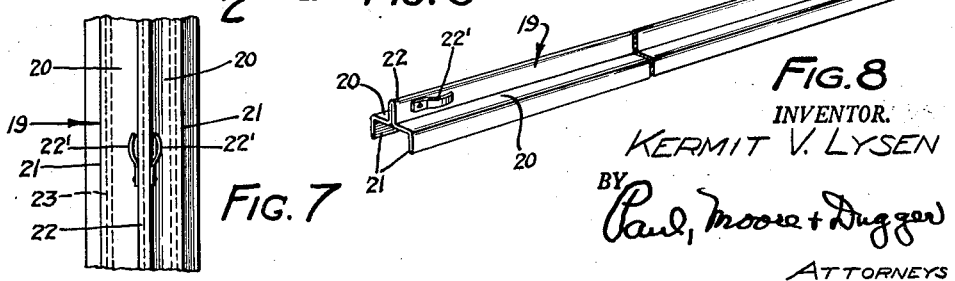

2,812,992
Patented Nov. 12, 1957

2,812,992
LUGGAGE CARRIERS FOR AUTOMOBILES
Kermit V. Lysen, Willmar, Minn.

Application January 18, 1954, Serial No. 404,758

2 Claims. (Cl. 312—311)

The present invention relates to new and useful improvements in luggage carriers for automobiles, and more particularly to such a device which may readily be mounted on an automobile top.

An object of the present invention is to provide a luggage carrier comprising a streamlined housing having means for detachably securing it to the top of an automobile, said housing comprising opposed side walls, and at least one of said side walls having an opening therein through which access may be had to the interior of the housing, and a suitable door being provided for normally closing said opening.

A further object is to provide a luggage carrier having means therein for slidably receiving one or more drawers which are removably supported in the carrier housing, whereby they may readily be removed therefrom to facilitate transporting bulky luggage and other merchandise within the carrier.

Other objects of the invention reside in the specific construction of the carrier housing and the means for supporting it on the vehicle, whereby the bottom wall of the housing is spaced from the automobile top to permit free air circulation therebetween; in the streamlined configuration of the carrier housing, whereby it offers minimum resistance to air flow when the car is traveling at high speed; in the construction of the combined drawer spacer and guide rail whereby said spacer is frictionally supported within the lower portion of the carrier housing when one or more drawers are supported within the housing, in the specific construction of the means for detachably supporting the carrier housing on an automobile top and whereby the spacing between the vacuum cups crosswise of the carrier may be varied to adapt the carrier for mounting on automobile tops of different widths; in the specific construction of the housing whereby it readily lends itself for manufacture in quantity production at low cost; and in the provision of a luggage carrier of this general type which is extremely light in weight and at the same time is rigid and strong, and the drawers of which extend substantially the full width of the carrier housing whereby they may be utilized for storing and transporting wearing apparel, such as men's and ladies' suits and dresses substantially without wrinkling, and said drawers being useable as a wardrobe for such garments when removed from the carrier housing and placed on one end, the drawers being provided at one end with means for supporting clothes hangers, thereby to facilitate hanging or supporting wearing apparel or garments within the drawers when thus placed on one end.

These and other objects of the invention and the means for their attainment will be more aparent from the following description, taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 5 is an enlarged detail sectional view on the line 5—5 of Figure 6, showing a carrier having two drawers mounted therein and a Dry Ice container being supported in one of the drawers;

Figure 6 is a sectional plan view on the line 6—6 of Figure 5;

Figure 7 is an enlarged fragmentary view of a portion of the drawer spacer, showing the friction means provided thereon for securing the drawers against rattling when the automobile is in transit;

Figure 8 is a perspective view of the drawer spacer removed from the carrier housing.

Figure 1:
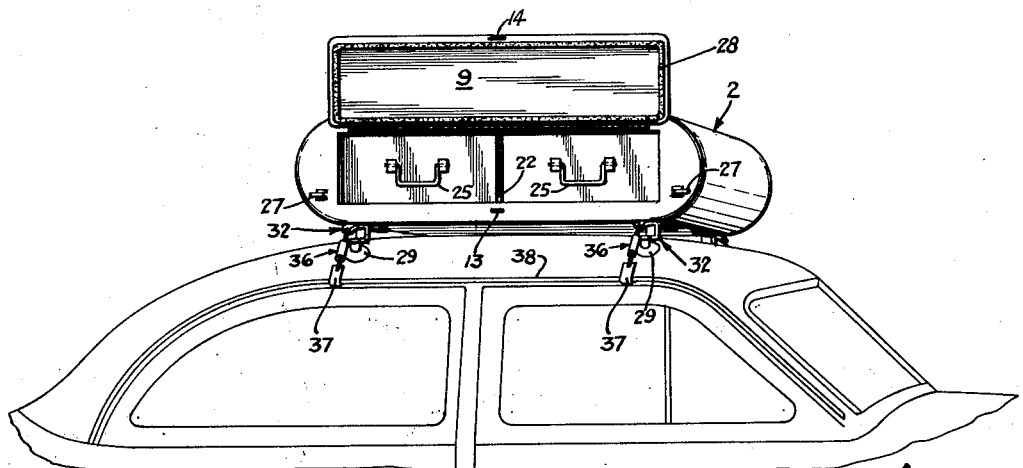
Figure 1 is a perspective view showing the top of an automobile with the novel luggage carrier mounted thereon having a service door in a side wall thereof, said door being shown open.

The novel luggage carrier herein disclosed is shown comprising a housing, generally designated by the numeral 2, comprising top and bottom walls 3 and 4, side walls 5 and 6, and semi-cylindrical front and rear walls 7—7. The side wall 6 is shown provided with an elongated opening 8 normally closed by a suitable service door 9, best shown in Figures 1 to 4, inclusive. The door is preferably secured to the side wall 6 by a piano hinge 11, best shown in Figure 4.

Figure 2:
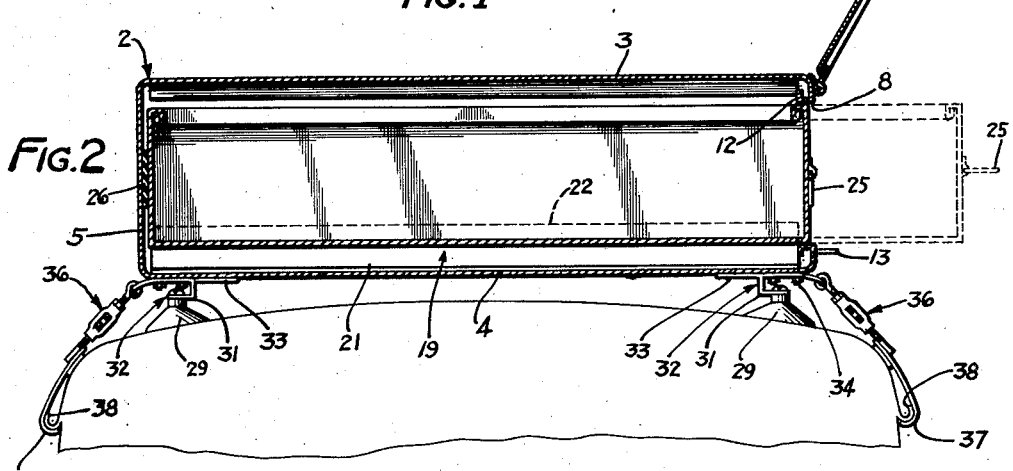
Figure 2 is an enlarged sectional view substantially on the line 2—2 of Figure 6, showing the means for supporting the luggage carrier on the automobile top, and also showing the length of the drawers within the housing.

To prevent deflection or distortion of the marginal edges of the opening 8, said marginal edges are bent inwardly and outwardly, as best illustrated at 12, in Figures 2 and 6, whereby said opening is defined by a relatively wide annular frame-like structure, as will readily be understood by reference to Figures 2 and 6.

Figure 3:
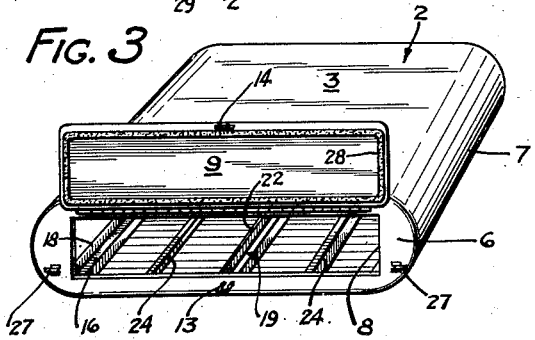
Figure 3 is a perspective view of the carrier housing; only on a relatively smaller scale.

Means is provided for securing the hinged door 9 against accidental opening when the car is in movement, and is shown comprising a hasp 13 secured to the side wall 6 below the opening 8, intermediately thereof, as best illustrated in Figure 3. An elongated opening or slot 14 is provided in the marginal edge of the door 9 for receiving the hasp 13, the latter extending sufficiently through the slot 14 to permit a padlock to be passed therethrough for locking the door against unauthorized opening, as will be understood.

Fixed within the housing adjacent the front and rear ends thereof are opposed rails 15 and 16, respectively, which are preferably formed of sheet metal folded upon itself, as illustrated in Figure 5, and having their lower marginal edges suitably welded or otherwise fixedly secured to the bottom wall 4 of the housing 2, as will be understood by reference to Figure 5. Each rail 15 and 16 is provided with a horizontal wall portion 17 to form ledges for slidably receiving one of the longitudinal corners of the bottom of a drawer. The upright portion 18 of each rail 15 and 16 provide guides for preventing lateral movement of the drawers, when moved inwardly or outwardly on their supporting rails.

The inner adjacent sides of the drawers are supported upon a combined spacer and guide, generally designated by the numeral 19. The spacer 19, as best illustrated in Figure 8, is formed from a strip of sheet metal bent longitudinally upon itself to form horizontal track portions 20, depending laterally spaced yieldable flanges 21, and a longitudinally extending vertical spacer rib 22. The upright central spacer rib 22 forms a separator and guide for the inner sides of the two drawers, as will be understood by reference to Figures 5 and 6.

An inverted channel member 23 is secured to the bottom wall 4 of the carrier housing to reinforce said bottom wall, and also to provide means for supporting the combined spacer and guide 19 in position within the housing. In other words, the depending flanges or wall portions 21 of the spacer are designed to frictionally grip the opposed walls of the inverted channel 23, when the spacer is pressed downwardly into position thereon, as will be understood.

Other reinforcing bars 24 are secured to the bottom wall 4 of the housing between the end rails 15 and 16 and the channel bar 23, thereby to reinforce the bottom wall against deflection when a heavy load is carried within the housing. Angle bars 30 are also secured to the top wall 3, as indicated in Figure 5.

The drawers, as will be noted by reference to Figures 2 and 6, extend substantially the full width of the carrier housing, and each has a handle or drawer pull 25 to facilitate manipulation of the drawers, when inserting them into the housing or withdrawing them therefrom. Suitable buffer elements 26 may be secured to the side wall 5 to prevent the inner ends of the drawers from directly engaging said side wall, when the drawers are pushed into the carrier housing, as will be understood. The drawers are so proportioned that when completely inserted into the housing, and the door 9 is closed, the drawers are secured against relative movement within the housing.

Figure 4:
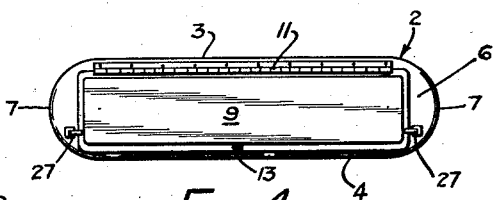
Figure 4 is a side view of the carrier housing showing the service door in its normal closed position.

Spring actuated latches or keepers 27 are secured to the side wall 6 for securing the door 9 against opening, when the door is moved into its closed position, as shown in Figures 4 and 6. A suitable sealing element 28 is provided on the door adjacent to the marginal edge thereof for engaging the outer surface of the side wall 6 to prevent dust or moisture from entering the housing when the door 9 is closed and the automobile is in transit. Spring elements 22' are secured to the opposed sides of the upright spacer rib 22 to prevent fore-and-aft play of the drawers in their guides within the housing.

Figure 9:
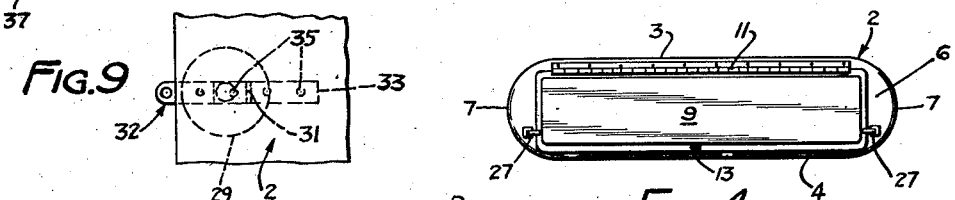
Figure 9 is a fragmentary view showing the adjustable mounting of the vacuum cups, whereby the spacing therebetween, crosswise of the carrier, may be varied to adapt the carrier for car tops of different widths.

The means provided for detachably securing the luggage carrier to an automobile top is best illustrated in Figures 2 and 9, and comprises a plurality of rubber vacuum cups 29, each secured to the L-shaped leg 31 of a bracket, generally designated by the numeral 32. The L-shaped leg of each bracket 32 is fixedly secured to an elongated strap portion 33 adapted to be seated against the bottom wall 4 of the housing and secured thereto by suitable bolts 34, as best illustrated in Figures 2 and 9. Each bracket 32 has a plurality of uniformly spaced apertures 35 therein for receiving the bolts 34, and whereby the brackets 32 may be longitudinally adjusted on the bottom wall 4 of the housing, thereby to vary the spacing between the vacuum cups 29 crosswise of the automobile top, as will be understood by reference to Figures 2 and 9.

The outwardly projecting end of the strap portion 33 of each bracket 32 has one end of a turn buckle 36 secured thereto. The opposite end of the turn buckle has a hook element 37 secured thereto, which hook element is adapted to engage the usual longitudinally extending channels 38 provided at opposite sides of the automobile top, as indicated in Figure 2.

From the foregoing, it will be noted that the construction of the carrier housing drawers and the other parts thereof are extremely simple and inexpensive to manufacture, whereby the entire apparatus readily lends itself for manufacture at low cost, a highly desirable attribute in devices of this general type.

The housing and drawers are preferably constructed of an aluminum alloy to eliminate excess weight, and whereby the drawers may readily be manipulated within the housing and may also be carried conveniently from the automobile to a building, such as a hotel. When the drawers are positioned on one end, various garments and wearing apparel may readily be suspended from the top ends of the drawers by clothes hangers supported on a rod 39, fixed to the front end wall of each drawer, as will be understood by reference to Figure 6.

One or both drawers may be used or not, as desired, depending upon the nature of the luggage to be transported. When one or more drawers are used, the combined spacer and guide 19 is fitted onto the center reinforcing bar 23, as hereinbefore stated. When no drawers are to be used, the spacer 19 may be dispensed with, if desired.

The novel luggage carrier herein disclosed has been found extremely practical and efficient for tourists and sportsmen, as it provides adequate storage space for various articles such as are usually carried by tourists, hunters and fishermen. An important feature of the present invention resides in the fact that the contents of the carrier are always readily accessible by simply opening the service door of the carrier housing. The semi-cylindrical ends of the housing provide additional luggage spaces, as indicated in Figure 5, whereby the entire interior of the carrier housing may be utilized for carrying luggage, and the like.

The foregoing detailed description has been given for clearness of understanding only, and no unnecessary limitations should be understood therefrom, but the appended claims should be construed as broadly as permissible in view of the prior art.

I claim as my invention:

1. In a luggage carrier of the class described, a streamlined housing having top and bottom parallel walls, opposed parallel side walls, and semi-cylindrical front and rear walls, one of said walls having a door opening therein, the marginal edge wall portions defining the bottom of said opening being spaced upwardly from the bottom wall of the housing, spaced parallel rails secured to said bottom wall and extending transversely thereof with their ends disposed adjacent to the side walls of the housing and having their top surfaces disposed substantially in the plane of the lower marginal edge of said opening, a longitudinally extending upright guide flange secured to each rail, said guide flanges being aligned with the end walls of said door opening, a drawer adapted for sliding movement on said rails into and out of the housing, said upright guide flanges cooperating to guide the drawer in its sliding movements, and a hinged door for normally closing said opening.

2. A luggage carrier according to claim 1, wherein dual drawers are supported in said housing, said drawers having their contiguous side edge portions supported upon a third rail, and a longitudinally extending upright guide flange being secured to said third rail for spacing apart the adjacent walls of said drawers and cooperating with said first mentioned rails to guide the drawers in their sliding movements, and the upright guide flange of said third rail having spaced parallel resilient flanges adapted to embrace the opposite sides of the third rail, thereby to detachably secure said guide flange thereto.

References Cited in the file of this patent

UNITED STATES PATENTS

| | | |
|---|---|---|
| 658,498 | Coston | Sept. 25, 1900 |
| 873,914 | Vikaren | Dec. 17, 1907 |
| 1,477,056 | Hager | Dec. 11, 1923 |
| 2,109,571 | Le Boef | Mar. 1, 1938 |
| 2,176,913 | Mandel | Oct. 24, 1939 |
| 2,526,887 | Mack | Oct. 24, 1950 |
| 2,589,772 | Carter et al. | Mar. 18, 1952 |

FOREIGN PATENTS

| | | |
|---|---|---|
| 497,112 | Canada | Oct. 27, 1953 |